(12) United States Patent
Gundlach

(10) Patent No.: US 6,560,316 B1
(45) Date of Patent: May 6, 2003

(54) METHOD OF MONITORING A SUBSCRIBER OF AN INTELLIGENT NETWORK

(75) Inventor: Michael Gundlach, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/454,200

(22) Filed: Dec. 3, 1999

(30) Foreign Application Priority Data

Dec. 3, 1998 (DE) .......................................... 198 55 920

(51) Int. Cl.[7] .......................... H04M 1/24; H04M 3/08; H04M 3/22
(52) U.S. Cl. .............................................. 379/35; 379/7
(58) Field of Search ................ 379/7, 35, 32.01–32.05, 379/127.01, 142.01–142.18, 201.01, 202.01, 229–230

(56) References Cited

U.S. PATENT DOCUMENTS 5,590,171 A * 12/1996 Howe et al.

OTHER PUBLICATIONS

International Publication No. WO 97/41678 (Gundlach), dated Nov. 6, 1997.

International Patent Application WO 99/13655 (Erfurt), dated Mar. 18, 1999.

* cited by examiner

*Primary Examiner*—Duc Nguyen
(74) *Attorney, Agent, or Firm*—Laurence A. Greenberg; Werner H. Stemer; Ralph E. Locher

(57) ABSTRACT

The call number of a subscriber to be monitored is flagged in the service control point SCP with an indicator of one or more subscribers that are authorized to eavesdrop. When a communications link is set up, an identifier for the monitoring measure is transmitted to the exchange SSP, and a conference loop between the subscriber to be monitored, a calling or called second communications subscriber, and a third subscriber which is authorized to monitor is set up as soon as the identifier is known at the SSP.

9 Claims, 2 Drawing Sheets

METHOD OF MONITORING A SUBSCRIBER OF AN INTELLIGENT NETWORK

BACKGROUND OF THE INVENTION

1. Field of the Invention

Figure 1:
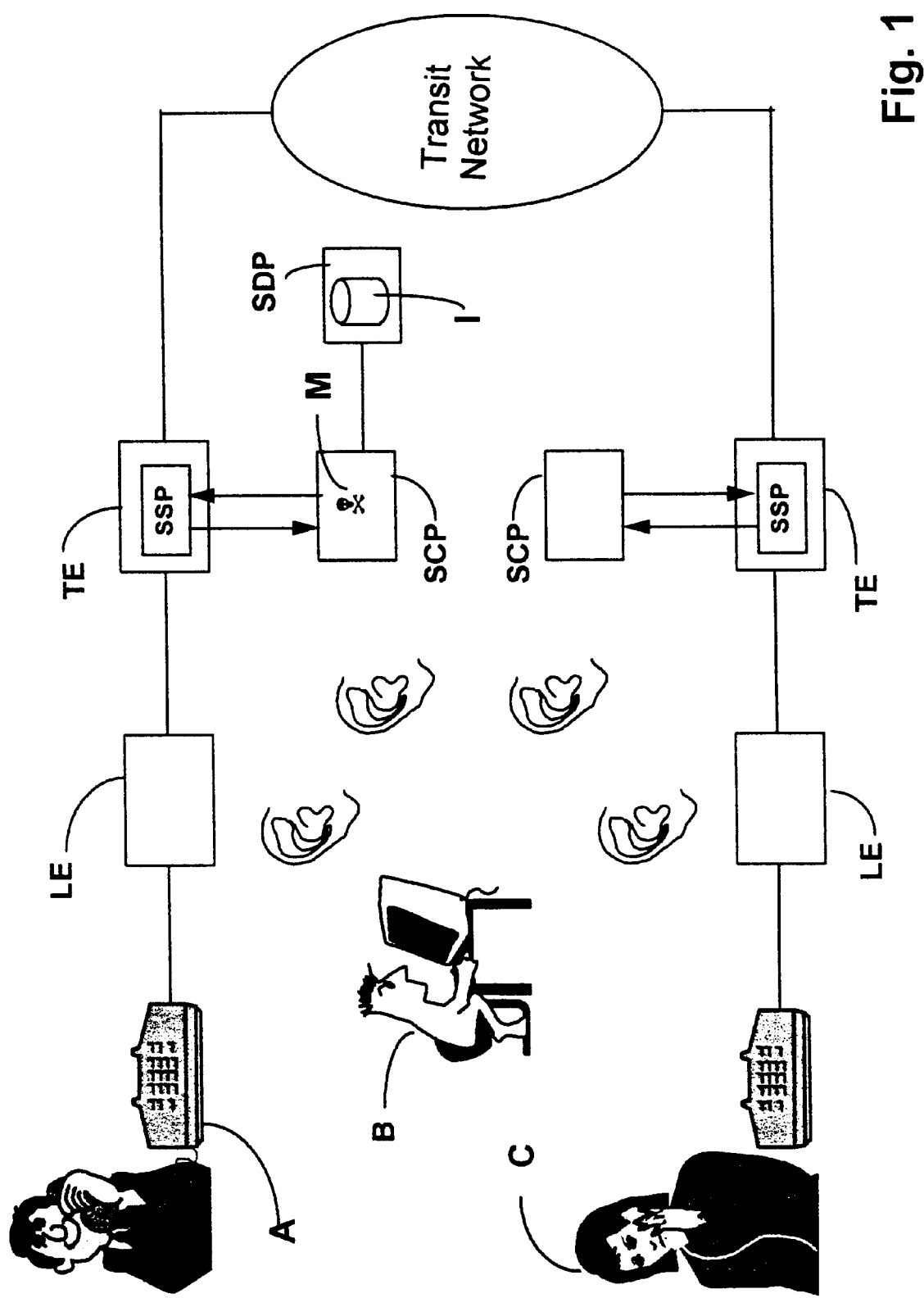

The invention lies in the telecommunications field and, more specifically, to surveillance processes in telecommunications.

In particular, the present invention relates to a method for monitoring a communications link, in particular a telephone call, between two communications subscribers. At least one of the call participants is a subscriber to be monitored. The identifier (for example the IN number or the "Personal User Identity") of the subscriber(s) to be monitored is flagged. The flag contains an indication of which third communications subscriber or subscribers is/are to be authorized to monitor a communications link to the subscriber(s) to be monitored. If a subscriber under surveillance is called or calls a second communications subscriber, a conference loop between the subscriber which is to be monitored, the calling or called second communications subscriber and the communications subscriber authorized to monitor is set up. National and international laws require that operators of a public, and in future it is expected also of a private, network should permit so-called authorized agencies (police, secret service, etc.) to monitor the telecommunications traffic of persons under suspicion, in compliance with certain legal regulations for the protection of communications subscribers (for example court orders). While this is relatively easy to do in the local exchange of the subscriber to be monitored in the case of conventional fixed-line telephone networks by flagging the corresponding subscriber data record and setting up a type of conference loop to the authorized agency, in intelligent networks (IN) there is a basic problem. This results from the division of the functions of signaling and of voice traffic between different network components. In the case of IN calls, it is generally not defined in advance which exchanges (VSt) calls of a subscriber which is to be monitored will pass through. In addition, all the data that are required for the monitoring operation (including IN numbers and fixed-network call numbers of the communications parties) are not available at the same location.

My earlier PCT publication WO 97/41678 specifies a method for monitoring a communications link which is suitable for communications services with IN services. However, for each monitoring action on the INAP interface it may be necessary to transmit large quantities of data between the Service Control Point (SCP) and the exchange.

SUMMARY OF THE INVENTION

It is accordingly an object of the invention to provide a method of monitoring a communications subscriber in an intelligent network, which overcomes the above-mentioned disadvantages of the heretofore-known methods of this general type and which provides for an improved method for monitoring a communications link.

With the foregoing and other objects in view there is provided, in accordance with the invention, a method of monitoring a subscriber of an intelligent network, which comprises:

flagging an identifier of a subscriber to be monitored in a database, the flagging including an indication of a third communications subscriber authorized to monitor a communications link to the subscriber to be monitored;

upon an establishment of a communications link between the subscriber to be monitored and a second communications subscriber (subscriber A is being called or calls subscriber B), setting up a conference loop between the subscriber to be monitored, the second communications subscriber, and the third communications subscriber authorized to monitor the communications link between the subscriber to be monitored and the second subscriber;

transmitting, for subscribers of an intelligent network, characteristic subscriber data to an authorized, third communications subscriber; and informing the exchange that has initiated the link to the database about the monitoring measure by transmitting an unambiguous identifier pointing to supplementary information necessary for the monitoring.

In other words, the procedure adopted here is as follows: the identifier (for example the IN number or the "Personal User Identity") of the subscriber which is to be monitored is flagged in the Service Control Point (SCP). This flagging contains, inter alia, an indication of which authorized agencies are provided with a monitoring facility. In an extension of the IN-specific protocol (INAP) between the SCP and the Service Switching Point (SSP) (usually in the transit exchange TE of the calling subscriber), the SSP is informed that a telephone call should be monitored. However, in this context, not all the supplementary information which is necessary for the monitoring operation such as (a) the start and end of the monitoring measure, (b) the designation of the addresses of the monitoring authorized agencies, and (c) order number, are transferred but rather just one unambiguous identifier. If this identifier is already known to the exchange in which the SSP is located (for example from an earlier monitoring operation), all the further necessary supplementary information is stored and a conference loop is set up to the authorized agency. The link data (fixed-network call numbers, IN numbers, time, duration of the call) and the contents of the call or of the data link are transferred online to the authorized agency. Otherwise, the exchange must interrogate the necessary supplementary information from the SCP or from another suitable database before the conference loop can be set up.

With this procedure according to the invention, the data transfer between the SSP and the SCP can be reduced to a minimum.

In accordance with an added mode of the invention, the conference loop is set up with the exchange that initiated the link to the database.

In accordance with an additional feature of the invention, the supplementary information necessary for the monitoring is stored at a central location, such as in the SCP. An extended INAP interface is used for the interrogation. However, it can also be stored in any other database at a central location so that the exchanges can access the information via a management interface.

A further advantageous refinement of the invention provides for the supplementary information to remain stored in the exchange even after the termination of the monitoring action. In this way, it is ready for later re-use and does not have to be explicitly requested again.

In accordance with another feature of the invention, the unambiguous identifier is not known at the exchange, and the necessary supplementary information is requested with the exchange after receiving the identifier.

In accordance with a further feature of the invention, the supplementary information is stored in the exchange.

In accordance with again an added feature of the invention, the supplementary information is deleted after an end of a monitoring time period or upon receiving a deletion order. So that the storage capacity of the exchange is not overloaded, in particular by supplementary information for monitoring actions which have already terminated, it is advantageous if, for example, the exchange can be instructed by the SCP, by means of a delete instruction, to delete the stored supplementary information.

In accordance with an extended embodiment of the invention, the addresses of those exchanges that have stored supplementary information are stored at a central location. In this embodiment, the SCP or another suitable database in turn stores the time at which and the exchange to which supplementary information has been sent. In this context, cyclical deletion may also be carried out, that is to say those exchanges which have been sent the supplementary information a maximum (or the longest) time prior to that point can be requested to perform deletion. The deletion prevents monitoring information which in unimportant, because it is no longer current, from taking up memory location for the exchange.

In accordance with a concomitant feature of the invention, deletion orders are transmitted to those exchanges which have stored the supplementary information for the longest time.

The monitoring data which are determined (that is to say the communication which takes place between the communications subscribers) can, instead of being transmitted directly to the authorized agency or agencies, be alternatively transmitted to a device which knows the necessary supplementary information and which automatically informs the appropriate authorized agencies. This device can be another exchange or else a specialized monitoring device.

Other features which are considered as characteristic for the invention are set forth in the appended claims.

Although the invention is illustrated and described herein as embodied in method for monitoring a subscriber of an intelligent network, it is nevertheless not intended to be limited to the details shown, since various modifications and structural changes may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

BRIEF DESCRIPTION OF THE DRAWING FIGURES

Figure 2:
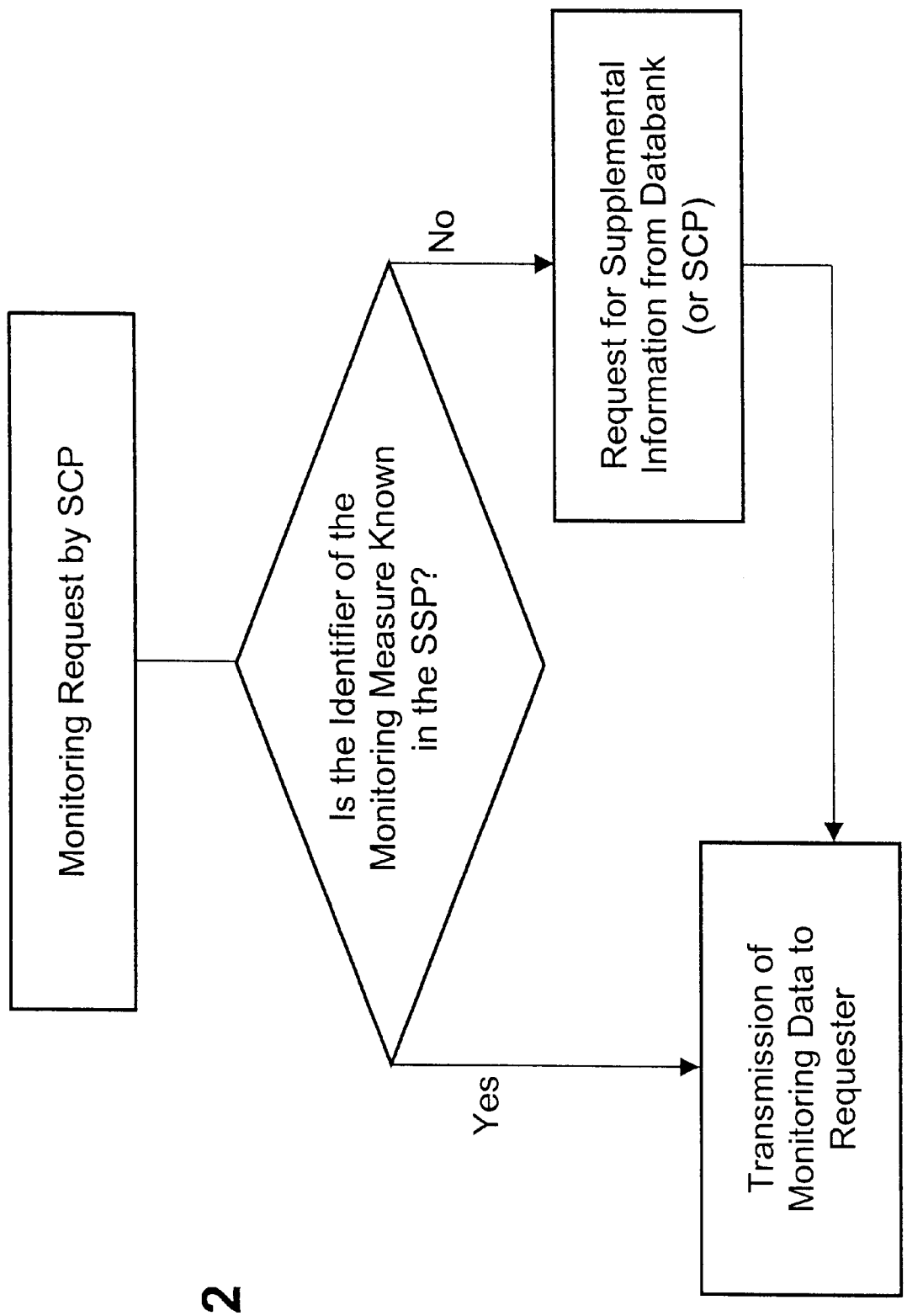

FIG. 1 is a schematic view illustrating the basic architecture with a monitored IN subscriber; and FIG. 2 is a flow diagram of the selection logic in the SSP.

DESCRIPTION OF THE PREFERRED EMBODIMENTS

Referring now to the figures of the drawing in detail, a sequence protocol for the example illustrated in FIG. 1 will first be described below. It will be understood that the following is intended exemplary only and any restrictions in the figures and exemplary embodiments are not considered limiting on the invention.

EXAMPLE 1

A subscriber A is to be monitored. The subscriber A is an IN (intelligent network) subscriber who calls a communications party C.

1. At the request of an authorized agency B, the IN number A is flagged in the SCP (service control point) as to be monitored M. The flagging procedure occurs once.
2. A makes an outgoing UPT call and dials the call number of C. The call is switched (via LE) and ultimately connects to an exchange TE with Service Switching Point SSP.
3. The SSP transfers, in the exchange TE, the IN number of A to the relevant service control point SCP.
4. The service data function SDF in the SCP checks the data associated with the IN number that is to be transferred, the data including:
   call-metering information;
   flagging that the subscriber is to be monitored;
   identity of the monitoring authorized agency.
5. The SCP transmits an unambiguous identifier to the SSP in the exchange TE.
6. If the identifier is already known to the exchange SSP, the data which are necessary for the monitoring are already known at the SSP and a link (conference loop) is established both to C and to the authorized agency B.
7. If, on the other hand, the data are not known, the SSP makes interrogations, using the identifier, to a central location such as a service data point SDP or to the SCP, for example. A conference loop cannot be set up until the data I have been transmitted. Monitoring data which may arise beforehand can be buffered.
8. The requested data (for example fixed-network call numbers and IN number, time and duration of the link) and the ongoing telephone call (or the data transmission) are transmitted to the authorized agency in a way which is imperceptible to A and C.

EXAMPLE 2

The subscriber A, who is an IN subscriber under surveillance, is being called by the communications party C.

1. At the request of the authorized agency B, the IN number of A is flagged in the SCP as to be monitored M. This procedure occurs once.
2. C dials the IN number of A.
3. The service switching point SSP transfers the IN number to the relevant service control point SCP.
4. The service data function SDF in the SCP checks the data which are associated with the IN number to be transferred, including:
   fixed-network call number;
   flagging that the subscriber is to be monitored;
   the identity of the monitoring authorized agency.
5. The SCP transmits the identifier to the SSP in the exchange TE. The rest of the procedure corresponds to items 6. and 7. in example 1.
6. The exchange uses these data to establish a conference loop both to A and to the authorized agency B.
7. The requested data (for example fixed-network call numbers, time and duration of the link) and the ongoing telephone call (or the data transmission) are transmitted from the exchange TE to the authorized agency B, in a way which is imperceptible to A and C.

FIG. 2 illustrates the selection logic according to which the SSP decides how it should behave after receiving a monitoring request. The SSP checks the identifier which it has received in a database that is available to it. If the identifier is not known there, the supplementary information necessary for the monitoring operation must still be requested. If delays occur as a result of the interrogation of the supplementary information, the information which is to be monitored can be buffered.

I claim:

1. A method of monitoring a subscriber of an intelligent network, which comprises:

flagging an identifier of a subscriber to be monitored in a database, the flagging including an indication of a third communications subscriber authorized to monitor a communications link to the subscriber to be monitored;

upon an establishment of a communications link between the subscriber to be monitored and a second communications subscriber, setting up a conference loop between the subscriber to be monitored, the second communications subscriber, and the third communications subscriber authorized to monitor the communications link between the subscriber to be monitored and the second subscriber;

transmitting, for subscribers of an intelligent network, characteristic subscriber data to an authorized, third communications subscriber; and informing the exchange that has initiated the link to the database about the monitoring measure by transmitting an unambiguous identifier pointing to supplementary information necessary for the monitoring.

2. The method according to claim 1, wherein the setting-up step comprises setting up the conference loop with the exchange that initiated the link to the database.

3. The method according to claim 1, which comprises storing the supplementary information necessary for the monitoring at a central location.

4. The method according to claim 1, wherein the unambiguous identifier is not known at the exchange, and which further comprises requesting the necessary supplementary information with the exchange after receipt of the identifier.

5. The method according to claim 1, which comprises storing the supplementary information in the exchange.

6. The method according to claim 5, which comprises deleting the supplementary information after an end of a monitoring time period.

7. The method according to claim 5, which comprises deleting the supplementary information upon receiving a deletion order.

8. The method according to claim 5, which comprises storing addresses of exchanges with the supplementary information stored therein at a central location.

9. The method according to claim 8, which comprises transmitting deletion orders to those exchanges which have stored the supplementary information for the longest time.

* * * * *